Patented Mar. 20, 1928.

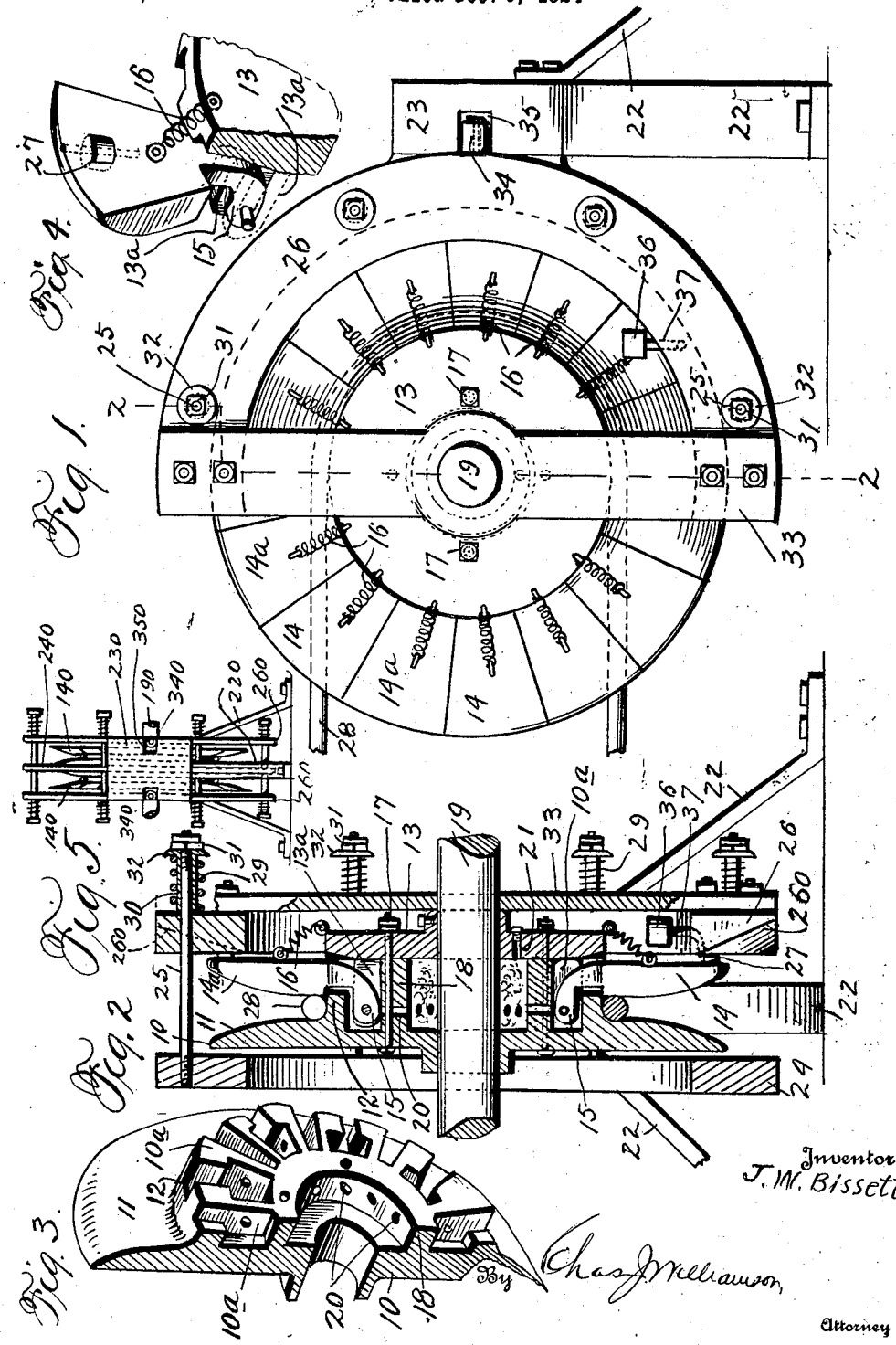

1,663,154

UNITED STATES PATENT OFFICE.

JOHN W. BISSETT, OF GARRISON, PENNSYLVANIA.

PULLEY.

Application filed December 9, 1924. Serial No. 754,779.

My invention relates to pulleys for the transmission of power, my object being to provide a pulley especially suited for use with rope form belting which by automatic action will assure the requisite friction grip of pulley and rope. By "rope" I mean any belt that is round in cross section whether cordage or made of steel wire and do not limit myself to any particular size of rope nor to any particular number of lines of rope drive as the principle of my invention may be embodied in pulleys for single, double or any number of lines. I contemplate embodying my invention in pulleys that are a unit from shaft to circumference or rim and also where the rim and central portion are separate units so that the rim is demountable. My invention consists in whatever is described by or is included within the terms or scope of the appended claims.

As will be evident a pulley embodying my invention has a rope receiving circumferential groove so that there are what in effect are two opposing annular flanges or jaws between which the rope lies, and briefly described my invention is embodied in a pulley in which one of the rope engaging jaws is a solid or continuous flange while the other jaw consists of a circumferential series of side by side segments having a pivotal connection with the stationary flange so that the segments may rock or swing towards and from the continuous flange to suit the thickness of the rope between the two flanges, and a stand or support is provided with arms or members between which the pulley flanges are situated, one of which members yieldably engages the outer side of the segments and by spring action presses said segments against the rope lying between them and the solid or continuous flange of the pulley. Hereinafter is a detailed description of what appears in the drawings as what I now consider satisfactory embodiments of the principle of my invention.

In the accompanying drawings:

Fig. 1 is a side view of a drive pulley embodying my invention;

Fig. 2 is a vertical section on line 2—2 of Fig. 1;

Figs. 3 and 4 are detail views in perspective of portions of the rope engaging members;

Fig. 5 is an end view of a two-line pulley.

Referring first to what is shown in Figs. 1 to 3 the pulley comprises two disk-form members, one designated, 10, whose peripheral portion or circumference forms the continuous rope engaging flange or jaw, 11, which on its rope engaging side tapers on a curve outwardly from the rope engaging rim, 12, which may be any diameter say ten inches, for the sake of illustration and the other member, 13, which has a diameter say of ten inches. To both members in an alternating arrangement are pivoted segments, 14, and 14$^a$, which constitute the other rope engaging flange of the pulley and whose faces towards the rope are tapered in correspondance with the taper of the opposing continuous flange, 11. The segments designated, 14, are pivoted to lugs, 10$^a$, on the member, 10, and the segments 14$^a$ are pivoted to lugs 13$^a$ on the member, 13, which lugs 13$^a$ extend in spaces between the pairs of lugs 10$^a$. Each segment has a reduced portion or tongue, 15, which extends between the pair of lugs to which the segment is pivoted. Each segment is pulled yieldingly outward by a light coil spring, 16, which at one end is attached to the segment and at the other end is attached to the periphery of the member, 13, so that the normal tendency of the segments, 14, under the pull of such springs is away from the continuous rope engaging flange, 11, but that tendency is opposed by the stronger spring pressure which is brought to bear upon the outer sides of the segments by the stand hereintofore mentioned between opposing portions of which the pulley revolves as hereinafter more fully set forth.

The two pulley members, 10, and 13, are firmly secured together by a number of bolts, 17, which extend through them from side to side parallel with the hole for the shaft, 19, which extends through them. A chamber or space is provided between the members, 10, and 13, concentric with the shaft, 19, by an annular wall, 18, that forms a lubricant reservoir for holding waste and oil in such wall which is provided with radial holes, 20, to allow lubricant to find its way to the pivots of the segments. Oil is supplied such reservoir through a hole, 21, leading into the same through the member, 13.

Stationarily supported by lugs, 22, is a standard, 23, from which a segment shape or semi-circular plate, 24, extends alongside the pulley member, 10, and passing through several holes in said plate, 24, parallel with the pulley axis are rods or bolts, 25, which are fixed to a substantially similar plate, 26, upon the opposite side of the pulley, and which by spring pressure engages the outer sides of the segments or anti-friction rollers, 27, mounted thereon so that as the segments revolve with or as a part of the pulley they are thereby pressed against the rope belt, 28, lying in the pulley groove.

The ends of the plate, 26, are bevelled to allow the easy passage of the rollers, as shown at 260, Fig. 2. The spring pressure upon the plate, 26, which causes the automatic adjustment of the pulley to the size or thickness of the rope is produced by a coil spring, 29, upon each of the bolts, which at one end bears against the side of the movable plate, 26, and at the other end bears against a shoulder or projection on the bolt so as to move the pressure producing plate, 26, against the sides of the segments, 14, and, 14ª. Preferably the coil spring, 29, is placed around a sleeve, 30, fitted over the bolt and confined thereon by a nut, 31, and having a lip or flange, 32, against which the spring bears. The ends of the movable plate segment, 26, are connected by a diametrically extending brace bar, 33, which has a central hole through which the shaft, 19, passes and midway between such extremities said segment, 26, has an anti-friction roller, 34, which engages a notch, 35, in the standard, 23, and while allowing free movement of the segment, 26, in an axial direction prevents any displacement thereof in a circular direction. To lubricate the anti-friction rollers, 27, on the segment, an oil cup, 36, may be provided which is supported on the segment, 26, and having an outlet pipe or tube, 37, with a wick in position to deliver oil to such rollers, 27, as they pass the wick in the revolution of the pulley the oil thus delivered being led to the roller pivots.

I show in Fig. 5 a pulley for a two-line drive which as will be evident involves merely the duplication of parts shown in Figs. 1 to 3, there being thus two sets of segments corresponding to the segments, 14, and 14ª, and the duplication of the single tapered flange, 11, and the duplication of the pulley members corresponding with the member, 13, and also of the adjustable or automatically shiftable segment engaging plate, 26.

What I claim is:

1. A grooved pulley for cooperation with a rope passing partially over the circumference of the pulley, said pulley having laterally movable rope-engaging fingers with surfaces that engage only the rope side, whereby the rope is free to move in a direction radial of the pulley into and out of contact with the circumference thereof, and automatic means to press such fingers against the rope side yieldable outwardly, the movement of the fingers outward depending entirely on the thickness of the rope.

2. A grooved pulley having laterally movable rope engaging fingers, and means to press said fingers towards the rope automatically and yieldable automatically outward, the fingers being at all times free to move dependent upon the thickness of the rope.

3. A grooved pulley having an annular flange that forms one wall of the groove and a rope engaging rim at the bottom of the groove and having the opposite wall of the groove formed of pivoted fingers extending in a circular series circumferentially of the pulley certain of said fingers being pivoted to said rim and an opposing member to which other of said fingers are pivoted.

4. A grooved pulley having laterally movable rope engaging fingers, the opposing wall of the groove being stationary as to lateral movement, and a stand having members upon opposite sides of the pulley one of said members normally engaging said fingers and yieldingly pressing against said fingers.

5. A grooved pulley comprising two side by side shaft-engaging members, one of which has a rope engaging rim and a flange extending outwardly from such rim, two sets of circumferentially extending series of rope engaging fingers extending radially beyond said rim and opposite said flange, one of said sets being pivoted to each of said members, and means acting automatically to press said fingers towards said flange.

6. A grooved pulley comprising two side by side shaft engaging members, one of which has a rope engaging rim and a flange extending outwardly from such rim, two sets of circumferentially extending series of rope engaging fingers extending radially beyond said rim and opposite said flange, one of said sets being pivoted to each of said members, means acting automatically to press said fingers towards said flange, comprising a member on the outer side of said fingers having a surface to engage the fingers on the outer side, and spring means acting upon said member.

7. A grooved pulley comprising two side by side shaft engaging members, one of which has a rope engaging rim and a flange extending outwardly from such rim, two sets of circumferentially extending series of rope engaging fingers extending radially beyond said rim and opposite said flange, one of said sets being pivoted to one of said members and the other set being pivoted to the other of said members, means acting automatically to press said fingers towards said flange, comprising a segment having an element on the outer side of said fingers having a surface in contact therewith, spring means acting upon said element to move it towards the fingers, a stationary support for said element, and means to prevent said element rotating while allowing axial movement thereof.

8. A grooved pulley having laterally movable rope engaging fingers, the opposing wall of the groove being stationary as to lateral movement, a stand having members upon opposite sides of the pulley one of said members engaging said fingers and movable in an axial direction, and means yieldingly pressing said axially movable member against said fingers.

In testimony whereof I hereunto affix my signature.

JOHN W. BISSETT.